US012645402B2

(12) United States Patent
Urrinkala et al.

(10) Patent No.: US 12,645,402 B2
(45) Date of Patent: *Jun. 2, 2026

(54) PERFORMANCE IN A FRAGMENTED MEMORY SYSTEM

(71) Applicant: Micron Technology, Inc., Boise, ID (US)

(72) Inventors: Vanaja Urrinkala, San Diego, CA (US); Sharath Chandra Ambula, Telangana (IN)

(73) Assignee: Micron Technology, Inc., Bosie, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/785,276

(22) Filed: Jul. 26, 2024

(65) Prior Publication Data

US 2025/0028485 A1 Jan. 23, 2025

Related U.S. Application Data

(63) Continuation of application No. 17/690,691, filed on Mar. 9, 2022, now Pat. No. 12,079,514.

(51) Int. Cl.
G06F 3/06 (2006.01)
(52) U.S. Cl.
CPC .......... G06F 3/0659 (2013.01); G06F 3/0604 (2013.01); G06F 3/0673 (2013.01)
(58) Field of Classification Search
CPC ..... G06F 3/0659; G06F 3/0604; G06F 3/0673
See application file for complete search history.

(56) References Cited

U.S. PATENT DOCUMENTS

| | | | | |
|---|---|---|---|---|
| 2008/0228959 | A1* | 9/2008 | Wang | G06F 1/206 710/22 |
| 2010/0274933 | A1* | 10/2010 | Wang | G06F 3/0634 710/22 |
| 2016/0179404 | A1* | 6/2016 | Nanduri | G06F 3/0613 711/103 |
| 2018/0081832 | A1* | 3/2018 | Longo | H04L 67/10 |
| 2018/0107595 | A1* | 4/2018 | Jung | G06F 13/4282 |
| 2019/0348089 | A1* | 11/2019 | Hasbun | G06F 12/0893 |
| 2019/0369904 | A1* | 12/2019 | Imamura | G06F 3/061 |
| 2020/0042249 | A1* | 2/2020 | Kang | G06F 12/0888 |
| 2020/0210110 | A1* | 7/2020 | Richter | G11C 7/22 |

(Continued)

*Primary Examiner* — Tasnima Matin
(74) *Attorney, Agent, or Firm* — Holland & Hart LLP

(57) ABSTRACT

Methods, systems, and devices for improved performance in a fragmented memory system are described. The memory system may detect conditions associated with a random access parameter stored at the memory system to assess a level of data fragmentation. The memory system may determine that a random access parameter, such as a data fragmentation parameter, a size of information associated with an access command, a depth of a command queue, a delay duration, or a quantity of commands satisfies a threshold. If one or more of the random access parameters satisfies the threshold, the memory system may transmit a request for the host system to increase an associated clock frequency. The host system may increase the number of commands sent to the memory system in a duration of time. That is, the host system may compensate for a slow-down due to data storage fragmentation by increasing the command processing rate.

20 Claims, 5 Drawing Sheets

(56) References Cited

U.S. PATENT DOCUMENTS

| 2021/0255768 A1* | 8/2021 | Majerus ................ G06F 3/0635 |
| 2021/0311661 A1* | 10/2021 | Kotzur ................ G06F 11/1076 |
| 2022/0147270 A1* | 5/2022 | Soberanes ............. G06F 3/0604 |

* cited by examiner

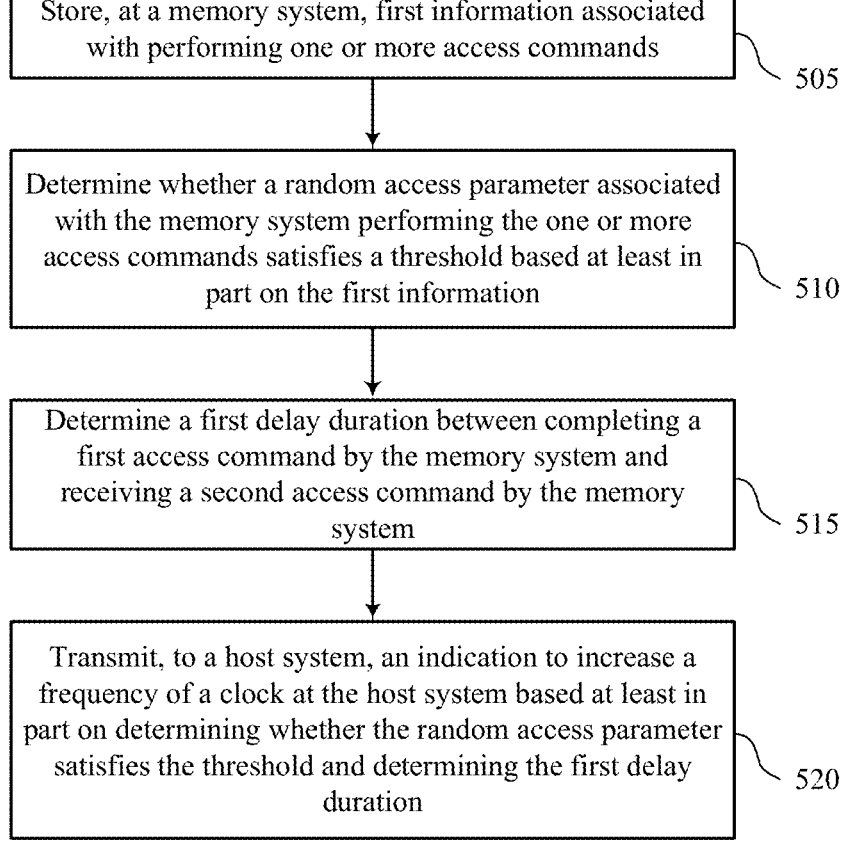

Store, at a memory system, first information associated with performing one or more access commands ⟍ 505

Determine whether a random access parameter associated with the memory system performing the one or more access commands satisfies a threshold based at least in part on the first information ⟍ 510

Determine a first delay duration between completing a first access command by the memory system and receiving a second access command by the memory system ⟍ 515

Transmit, to a host system, an indication to increase a frequency of a clock at the host system based at least in part on determining whether the random access parameter satisfies the threshold and determining the first delay duration ⟍ 520

PERFORMANCE IN A FRAGMENTED MEMORY SYSTEM

CROSS REFERENCE

The present Application for Patent is a continuation of U.S. patent application Ser. No. 17/690,691 by Urrinkala et al., entitled "IMPROVED PERFORMANCE IN A FRAGMENTED MEMORY SYSTEM," filed Mar. 9, 2022, assigned to the assignee hereof, and is expressly incorporated by reference in its entirety herein.

FIELD OF TECHNOLOGY

The following relates to one or more systems for memory, including improved performance in a fragmented memory system.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

BRIEF DESCRIPTION OF THE DRAWINGS

FIG. 5 shows a flowchart illustrating a method or methods that support improved performance in a fragmented memory system in accordance with examples as disclosed herein.

DETAILED DESCRIPTION

Electronic devices (e.g., smartphones, laptops) may include host systems and memory systems that together aid in one or more services performed by the electronic device. For example, the electronic device may include one or more systems-on-a-chip (SoC), which may be an example of a host system, that may be coupled with a memory system. In some examples, the memory system and the host system (e.g., SoC) may each have data storage components. In some cases, the host system may have an associated frequency (e.g., a central processing unit (CPU) frequency) that may determine a processing rate of the host system or the memory system. As the electronic device ages, data storage at the host system may become more fragmented (e.g., dirtier) after a quantity of access operations, which may cause the host system to take more time to prepare commands for subsequent access operations. In some cases, the host system may request smaller-sized packets of data due to fragmentation of the stored data. Such conditions may reduce the performance of the memory system and the overall electronic device.

Accordingly, the techniques described herein enable improved performance in a fragmented memory system. For example, the memory system may be configured to detect conditions associated with a random access parameter stored at the memory system to assess a level of data fragmentation. The memory system may determine that a random access parameter, such as a data fragmentation parameter, a size of information associated with an access command, a depth of a command queue, a delay duration, or a quantity of commands satisfies a threshold. In some cases, the memory system may use an algorithm to assess each of the random access parameters and determine a level of data fragmentation In some cases, if one or more of the random access parameters satisfies the threshold, the memory system may transmit a request for the host system to increase its clock frequency (e.g., CPU frequency). By increasing the frequency, the host system may increase the number of commands sent to the memory system in a duration of time. That is, the host system may compensate for a slow-down due to data storage fragmentation by increasing the command processing rate. By increasing the quantity of commands, the memory system may improve performance under conditions (e.g., data storage fragmentation) that may normally cause a processing slow-down.

Figure 1:
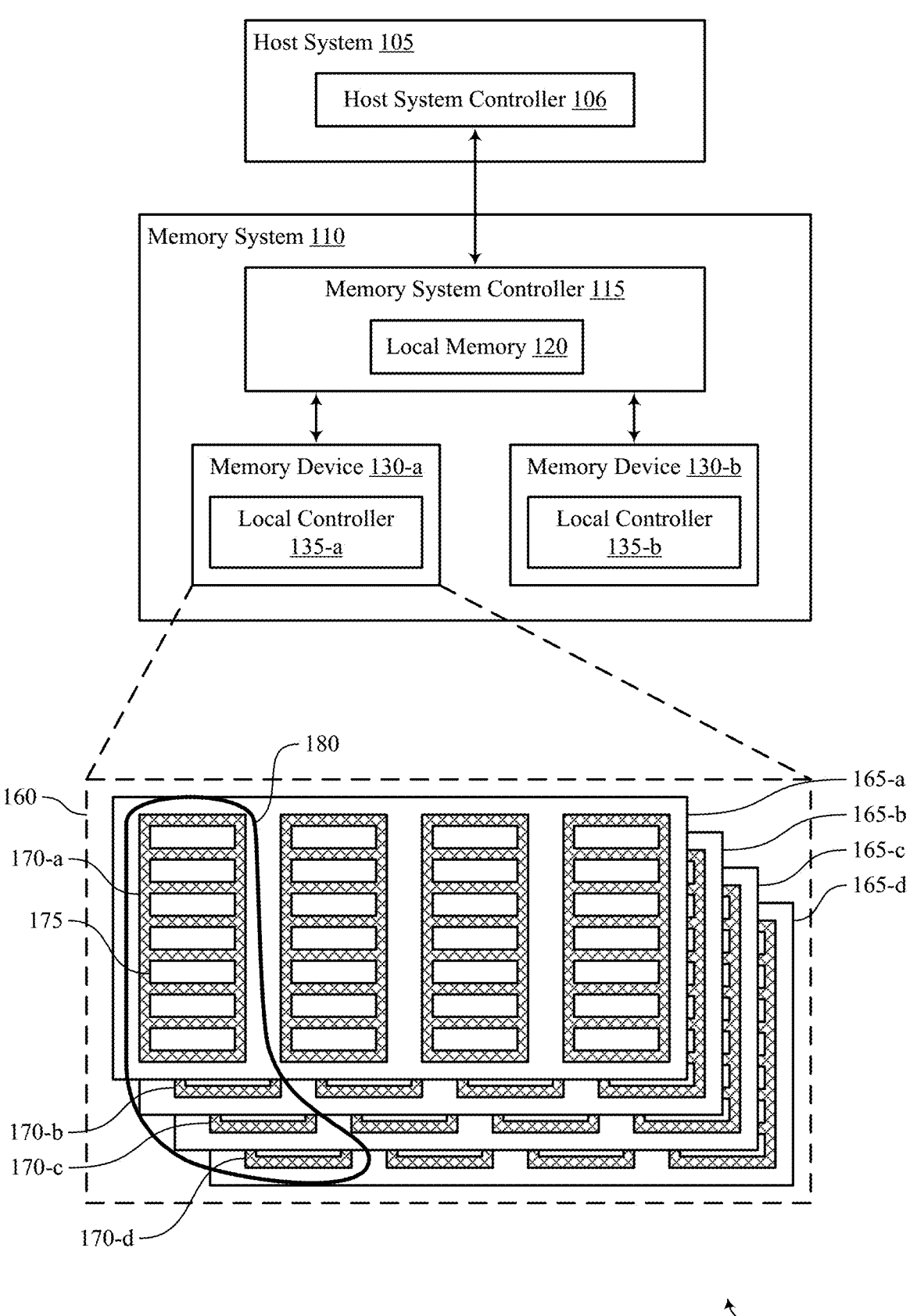
FIG. 1 illustrates an example of a system that supports improved performance in a fragmented memory system in accordance with examples as disclosed herein.

Features of the disclosure are initially described in the context of systems, devices, and circuits with reference to FIG. 1. Features of the disclosure are described in the context of systems and process flows with reference to FIGS. 2-3. These and other features of the disclosure are further illustrated by and described in the context of an apparatus diagram and flowchart that relate to improved performance in a fragmented memory system with reference to FIGS. 4-5.

FIG. 1 illustrates an example of a system 100 that supports improved performance in a fragmented memory system in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EE-PROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be rewritten with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support improved performance in a fragmented memory system. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, the host system 105 and the memory system 110 may experience reduced performance due to data fragmentation. For example, as access commands are performed over time, some portions of data may be deleted (e.g., during garbage collection) and new data may be rewritten. In some cases, rewriting data may lead to smaller-sized packets of data interspersed with small regions of free space. In such cases, access commands may be associated with smaller portions of data, and thus may be associated with reduced performance. To compensate for the effects of data fragmentation and improve performance, the host system 105 or the memory system 110 may implement aspects of an algorithm to determine a level of data fragmentation at the device. For example, if the host system 105 or the memory system 110 detects a threshold level of data fragmentation, the host system 105 may increase a frequency of a clock (e.g., a CPU rate) to enable an increased number of commands to be completed during a duration.

Figure 2:
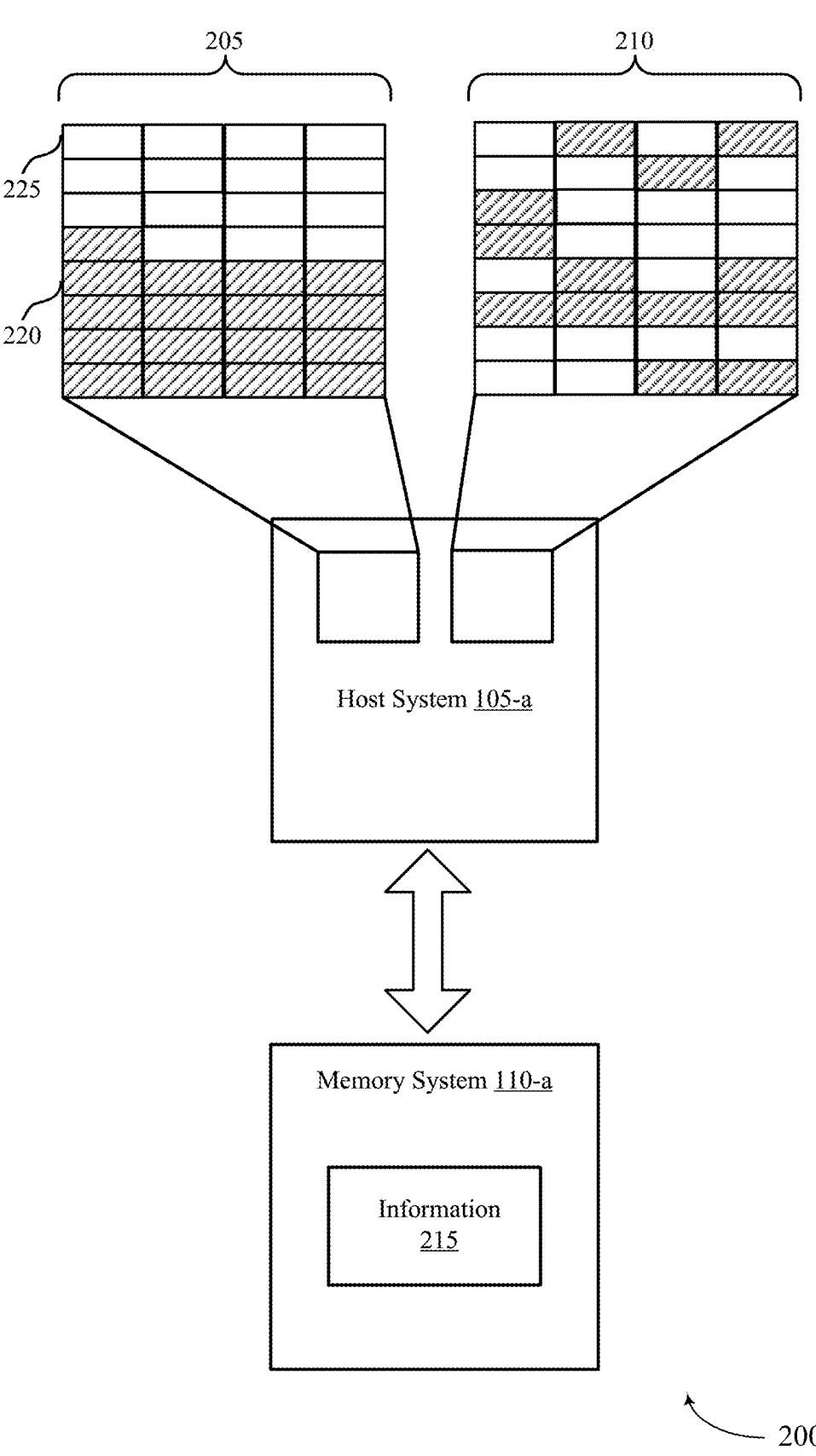
FIG. 2 illustrates an example of a system that supports improved performance in a fragmented memory system in accordance with examples as disclosed herein.

FIG. 2 illustrates an example of a system 200 that supports improved performance in a fragmented memory system in accordance with examples as disclosed herein. The system 200 may be an example of aspects of a memory system as described with reference to FIG. 1. For example, the system 200 may include the host system 105-a, which may be an example of a host system 105 as described with reference to FIG. 1, and the memory system 110-a, which may be an example of a memory system 110 as described with reference to FIG. 1. The host system 105-a may include a clean data storage 205 and a dirty data storage 210. Both the clean data storage 205 and the dirty data storage 210 may include filled addresses 220 and empty addresses 225. The memory system 110-a may include an information 215.

The host system 105-a, which may be an example of an SoC, may include one or more portions of memory (e.g., SRAM, DRAM). For example, the clean data storage 205 and dirty data storage 210 may each be examples of volatile or non-volatile memory at the host system. At a clean portion of memory, such as the clean data storage 205, the filled addresses 220 may be adjacent to one another (e.g., sequentially indexed addresses). By writing information such that the filled addresses 220 may be adjacent, the host system 105-a may be enabled to perform read operations referencing a range of adjacent addresses. Similarly, by having many adjacent empty addresses 225, the host system may be enabled to perform write operations for larger amounts of data written to multiple adjacent addresses. In some cases, being able to associate a larger amount of data with a single read or write command may improve efficiency and performance at the electronic device.

In some cases, a portion of memory (such as the clean data storage 205) may become more fragmented over time as the host system performs access operations. For example, the host system 105-a may write information to a quantity of empty addresses 225, thereby changing them to filled addresses 220. In some cases, the host system 105-a may additionally or alternatively delete some portions of data (e.g., during garbage collection), thereby changing a quantity of filled addresses 220 into empty addresses 225. After some time, the clean data storage 205 may become more similar to the dirty data storage 210. That is, the clean data storage may be rewritten to have smaller quantities of filled addresses 220 interspersed by smaller quantities of empty addresses 225. In a more fragmented portion of memory, such as the dirty data storage 210, the host system may be more restricted to perform access operations (e.g., read and write operations) at smaller-sized packets of data. Such restrictions may reduce the performance of the host system 105-a, the memory system 110-a, and the overall electronic device by increasing the quantity of commands used to access the same amount of information.

To improve performance in a fragmented memory system, the host system 105-a may, in some cases, increase a clock frequency (e.g., a CPU frequency) of the host system 105-a. The memory system 110-a may store information used to determine whether to increase the clock frequency By increasing the clock frequency, the host system 105-a may be enabled to increase the number of access operations performed in a duration of time, thus increasing processing capability. In some cases, the increased clock frequency may compensate for the smaller-sized packets of data associated with each access operation in the fragmented memory system. Increasing the clock frequency of the host system 105-a may provide improvements when the memory system 110-a has additional capacity to process and otherwise handle access commands.

The memory system 110-a may be coupled with the host system 105-a and may track information associated with a random access parameter of the host system 105-a. In some cases, the host system 105-a may be coupled with multiple memory systems 110. The memory system 110-a may include a portion of memory (e.g., DRAM, NAND) that may include the information 215. The information 215 may be information related to a random access parameter, which may be used to determine whether a portion of memory at the host system 105-a (e.g., the clean data storage 205, the dirty data storage 210) has reached a level of fragmentation that may trigger an increase in the clock frequency.

In some cases, the information 215 may include a data fragmentation parameter. In some examples, the data fragmentation parameter may directly quantify a level of fragmentation at a portion of memory, such as the clean data storage 205 or the dirty data storage 210. In such examples, the memory system 110-a may be configured to characterize the level of fragmentation at the portion of the memory. In some cases, the information 215 may include a size of information associated with one or more access commands. For example, in cases if the memory system 110-a receives an access command from the host system 105-a, the memory system 110-a may store a record of the size of information associated with the command at the information 215. In such cases, the memory system 110-a may evaluate whether the sizes of information associated with one or more access commands over a duration satisfies a threshold (e.g., an average size of information over the duration). In some cases, the information 215 may include a depth of a command queue (e.g., a number of pending commands to be performed by the memory system 110-a). In such cases, if the depth of the command is relatively small, it may indicate that the memory system 110-a has capacity to process additional commands. In some cases, the information 215 may include a quantity of hibernate commands issued over a duration. For example, a hibernate command may be associated with a temporary power-down of a memory system 110-a.

In some cases, the memory system 110-a may determine that a parameter stored in the information 215 may satisfy a threshold. For example, there may be pre-defined threshold associated with a data fragmentation parameter, a size of information, a depth of a command queue, or a quantity of hibernate commands. Each threshold may be associated with a level of fragmentation at the host system 105-a. In the case of the memory system 110-a determining that a parameter may satisfy a threshold, the memory system 110-a may transmit an indication to the host system 105-a to increase the frequency of the clock. In some cases, if a parameter fails to satisfy a threshold, the memory system 110-a may reset (e.g., delete) the information 215. In some cases, if a number of hibernate commands satisfies a threshold, the memory system 110-a may reset the information 215. Thus, the memory system 110-a may maintain an up-to-date record of the level of fragmentation at the host system 105-a and may trigger the host system 105-a to increase its clock frequency in response to a threshold amount of fragmentation.

Figure 3:
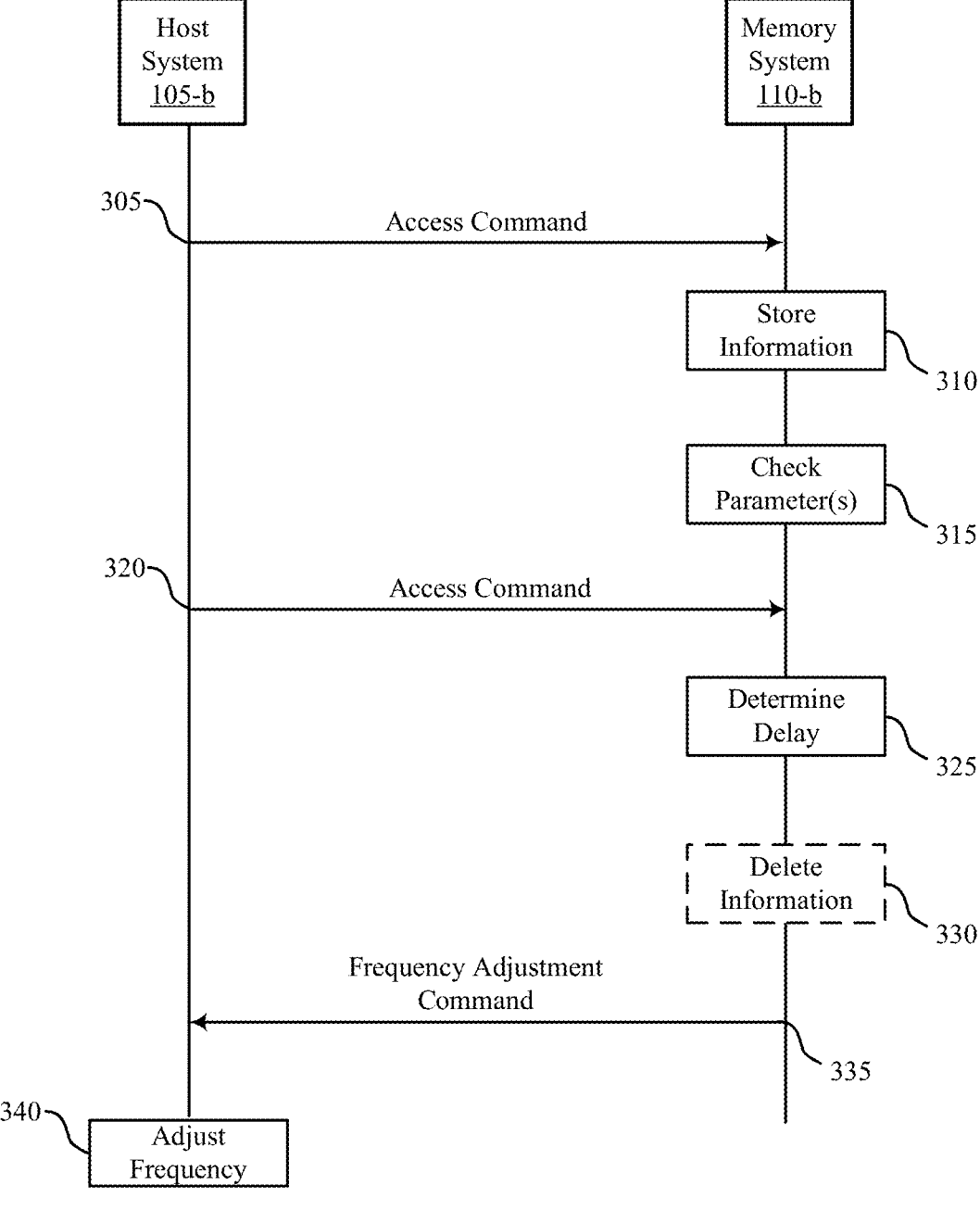
FIG. 3 illustrates an example of a process flow that supports improved performance in a fragmented memory system in accordance with examples as disclosed herein.

FIG. 3 illustrates an example of a process flow 300 that supports improved performance in a fragmented memory system in accordance with examples as disclosed herein. Process flow 300 may be implemented by one or more components of a memory system as described with reference to FIGS. 1-2. For example, aspects of the process flow 300 may be performed by or between a host system 105-b and a memory system 110-b.

At 305, the host system 105-b may transmit an access command (e.g., a first access command) to the memory system 110-b. For example, the access command may be a read command or a write command. In some cases, the access command may be associated with a large packet of data (e.g., a 512 k-size data packet) that may be written to a quantity of adjacent addresses at the memory system 110-b. In some cases, the access command may be associated with a small packet of data (e.g., a 4 k-size data packet, a less-than-512 k-size data packet) that may be written at a single address or a smaller quantity of adjacent addresses at the memory system 110-b. In some cases, the memory system 110-b may perform an access operation in response to receiving the access command. In some cases, the memory system 110-b may complete the access operation before receiving a subsequent access command (e.g., a second access command).

At 310, the memory system 110-b may store information associated with the access command. For example, the memory system 110-b may include a dedicated portion of memory, as described with reference to FIG. 2, for maintaining a history of commands and other associated information. The stored information may include a data fragmentation parameter, a size of information associated with an access command, a depth of a command queue, or a quantity of hibernate commands. As the memory system 110-b receives more access commands, the amount of stored information related to the access commands may increase.

At 315, the memory system 110-b may check one or more parameters stored at the dedicated portion of memory. For example, the memory system 110-b may determine if one or more parameters satisfies an associated threshold. In some cases, as described with reference to FIG. 2, each threshold may be associated with a level of fragmentation at the host system 105-b. In some cases, the memory system 110-b may periodically or continually monitor the information at the dedicated portion of memory. In such cases, after information is added or updated (e.g., at step 310, after receiving each access command) the memory system 110-*b* may determine that a threshold may be satisfied.

At 320, the memory system 110-*b* may transmit a second access command to the memory system 110-*b*. For example, the access command may be a read command or a write command. The access command at step 305 and the access command step 320 may be examples of a quantity of access commands received during the lifetime of the memory system 110-*b* and the host system 105-*b*.

At 325, the memory system 110-*b* may determine a first delay duration between completing the first access command and receiving the second access command. The first delay duration may be associated with a characteristic processing speed of the memory system 110-*b* or the host system 105-*b*. In some cases, longer delays may be associated with the memory system 110-*b* having additional capacity to perform access operations and the host system 105-*b* being responsible for delays. In such conditions, increasing a speed with which the host system 105-*b* process commands may increase the performance of the electronic device. A longer first delay duration may be an indication of fewer access commands being performed by the memory system 110-*b*, which may lead to slower processing and poor performance at the memory system 110-*b* and the electronic device. In some cases, the memory system 110-*b* may use an algorithm to monitor the first delay duration. Additionally or alternatively, in some cases the host system 105-*b* may monitor the first delay duration.

In some examples, at 330, the memory system 110-*b* may delete information at the dedicated portion of memory (which may be used to store information about whether the host system is to increase its clock frequency). The memory system may maintain a history of information that it may use to determine whether to ask the host system to increase its clock frequency. Deleting information at the dedicated portion of the memory may be similar to resetting the history being maintained by the memory system. In some cases, the memory system 110-*b* may selectively delete portions of data. In some cases, the memory system 110-*b* may delete the entire contents of the dedicated portion of memory, as described with reference to FIG. 2. In some cases, the memory system 110-*b* may delete information at the dedicated portion of memory in response to determining, at step 315, that one or more parameters does not satisfy a threshold during a duration of time. For example, the memory system 110-*b* may delete information to enable refreshing stored parameters, such as deleting information about historical depths of a command queue over the duration of time. In some cases, the memory system 110-*b* may delete information at the dedicated portion of memory in response to the quantity of hibernate commands issued over a duration satisfying a threshold. For example, the threshold amount of memory system hibernations may be associated with a level of reduced activity and a corresponding lack of change in the fragmentation of the host system 105-*b*. In some cases, deleting information may also be referred to as a command history reset. If the memory system 110-*b* performs step 330 of the process flow 300, it may then restart the process flow 300 from step 305 rather than proceeding to step 335.

At step 335, the memory system 110-*b* may transmit an indication to increase a frequency of a clock at the host system 105-*b* in response to determining, at step 315, that a parameter may satisfy a threshold associated with a level of fragmentation at the host system 105-*b*. Additionally or alternatively, the memory system 110-*b* may transmit the indication after determining that the first delay duration satisfies a threshold at step 325. For example, the memory system 110-*b* may determine, in response to a combination of one or more parameters and the first delay duration, that the present frequency of a clock at the host system 105-*b* may be increased, and that doing so may improve reduced performance due to data fragmentation. In some cases, if the first delay duration is determined at the host system 105-*b*, the memory system 110-*b* may not transmit the indication and the host system 105-*b* may proceed to step 340.

At 340, the host system 105-*b* may adjust the frequency of a clock. For example, the clock may be associated with a characteristic processing speed of the host system 105-*b*, as described with reference to FIG. 2. In some cases, the host system 105-*b* may increase the frequency of the clock in response to receiving the indication from the memory system 110-*b* at step 335. In some cases, the host system 105-*b* may increase the frequency of the clock in response to other internal determinations. In some cases, the host system 105-*b* may interrupt other processes to increase the frequency of the clock. By adjusting the frequency, the host system 105-*b* may enable itself or the memory system 110-*b* to perform a greater quantity of commands during a duration of time, which may improve performance at the electronic device. For example, the host system 105-*b* may compensate for the effects of data fragmentation (e.g., access commands associated with smaller-sized data packets) by increasing the frequency and thereby increasing the number of performed commands.

Figure 4:
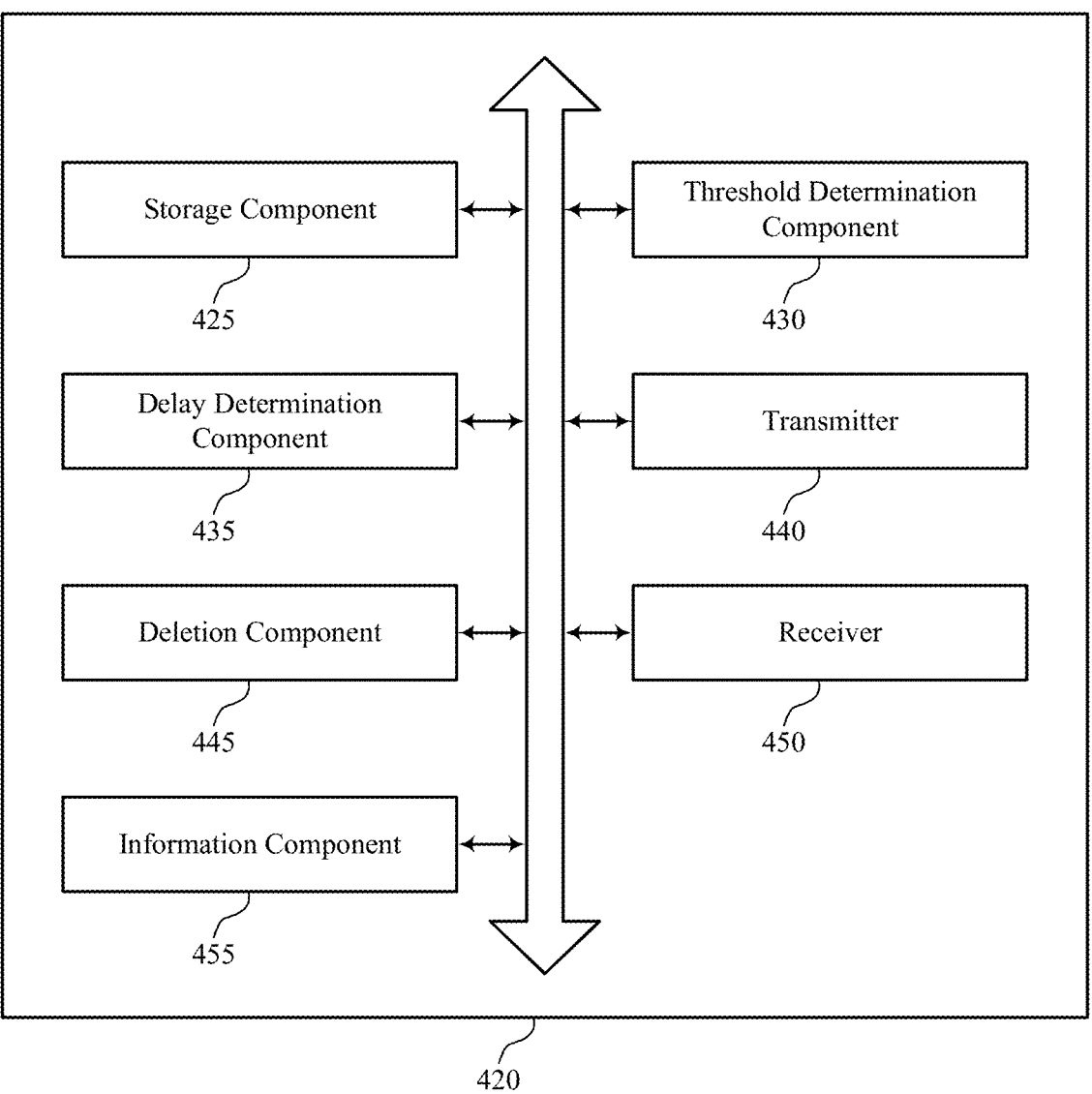
FIG. 4 shows a block diagram of a memory device that supports improved performance in a fragmented memory system in accordance with examples as disclosed herein.

FIG. 4 shows a block diagram 400 of a memory device 420 that supports improved performance in a fragmented memory system in accordance with examples as disclosed herein. The memory device 420 may be an example of aspects of a memory device as described with reference to FIGS. 1 through 3. The memory device 420, or various components thereof, may be an example of means for performing various aspects of improved performance in a fragmented memory system as described herein. For example, the memory device 420 may include a storage component 425, a threshold determination component 430, a delay determination component 435, a transmitter 440, a deletion component 445, a receiver 450, an information component 455, or any combination thereof. Each of these components may communicate, directly or indirectly, with one another (e.g., via one or more buses).

The storage component 425 may be configured as or otherwise support a means for storing, at a memory system, first information associated with performing one or more access commands. The threshold determination component 430 may be configured as or otherwise support a means for determining whether a random access parameter associated with the memory system performing the one or more access commands satisfies a threshold based at least in part on the first information. The delay determination component 435 may be configured as or otherwise support a means for determining a first delay duration between completing a first access command by the memory system and receiving a second access command by the memory system. The transmitter 440 may be configured as or otherwise support a means for transmitting, to a host system, an indication to increase a frequency of a clock at the host system based at least in part on determining whether the random access parameter satisfies the threshold and determining the first delay duration.

In some examples, to support determining whether the random access parameter satisfies the threshold, the threshold determination component 430 may be configured as or otherwise support a means for determining that a data fragmentation parameter of the memory system satisfies a data fragmentation threshold based at least in part on the first information, where the random access parameter includes the data fragmentation parameter, where the threshold includes the data fragmentation threshold, where transmitting the indication is based at least in part on determining that the data fragmentation parameter satisfies the data fragmentation threshold.

In some examples, to support determining whether the random access parameter satisfies the threshold, the threshold determination component 430 may be configured as or otherwise support a means for determining that a size of information associated with the one or more access commands performed by the memory system satisfies a second threshold, where the random access parameter includes the size of information, where the threshold includes the second threshold, where transmitting the indication is based at least in part on determining that the size of information satisfies the second threshold.

In some examples, to support determining whether the random access parameter satisfies the threshold, the threshold determination component 430 may be configured as or otherwise support a means for determining that a depth of a command queue storing the one or more access commands to be performed by the memory system satisfies a second threshold, where the random access parameter includes the depth of the command queue, where the threshold includes the second threshold, where transmitting the indication is based at least in part on determining that the depth of the command queue satisfies the second threshold.

In some examples, to support determining whether the random access parameter satisfies the threshold, the threshold determination component 430 may be configured as or otherwise support a means for determining that a quantity of hibernate commands issued over a duration associated with the first information satisfy a second threshold, where the random access parameter includes the quantity of hibernate commands, where the threshold includes the second threshold, where transmitting the indication is based at least in part on determining that the quantity of hibernate commands satisfies the second threshold.

In some examples, the threshold determination component 430 may be configured as or otherwise support a means for determining that the random access parameter associated with the memory system fails to satisfy the threshold after a duration of time based at least in part on the first information. In some examples, the deletion component 445 may be configured as or otherwise support a means for deleting the first information stored at the memory system based at least in part on the determining that the random access parameter fails to satisfy the threshold after the duration of time.

In some examples, the first information includes one or more of a command size, a queue depth, a command type, or a command delay duration associated with the one or more access commands.

In some examples, the threshold determination component 430 may be configured as or otherwise support a means for determining that the first delay duration satisfies a second threshold, where transmitting the indication to increase the frequency of the clock at the host system is based at least in part on determining that the first delay duration satisfies the threshold.

In some examples, the receiver 450 may be configured as or otherwise support a means for receiving, at the memory system, a command to increase the frequency of the clock at the host system. In some examples, the information component 455 may be configured as or otherwise support a means for updating the first information at the memory system based at least in part on receiving the command.

FIG. 5 shows a flowchart illustrating a method 500 that supports improved performance in a fragmented memory system in accordance with examples as disclosed herein. The operations of method 500 may be implemented by a memory device or its components as described herein. For example, the operations of method 500 may be performed by a memory device as described with reference to FIGS. 1 through 4. In some examples, a memory device may execute a set of instructions to control the functional elements of the device to perform the described functions. Additionally or alternatively, the memory device may perform aspects of the described functions using special-purpose hardware.

At 505, the method may include storing, at a memory system, first information associated with performing one or more access commands. The operations of 505 may be performed in accordance with examples as disclosed herein. In some examples, aspects of the operations of 505 may be performed by a storage component 425 as described with reference to FIG. 4.

At 510, the method may include determining whether a random access parameter associated with the memory system performing the one or more access commands satisfies a threshold based at least in part on the first information. The operations of 510 may be performed in accordance with examples as disclosed herein. In some examples, aspects of the operations of 510 may be performed by a threshold determination component 430 as described with reference to FIG. 4.

At 515, the method may include determining a first delay duration between completing a first access command by the memory system and receiving a second access command by the memory system. The operations of 515 may be performed in accordance with examples as disclosed herein. In some examples, aspects of the operations of 515 may be performed by a delay determination component 435 as described with reference to FIG. 4.

At 520, the method may include transmitting, to a host system, an indication to increase a frequency of a clock at the host system based at least in part on determining whether the random access parameter satisfies the threshold and determining the first delay duration. The operations of 520 may be performed in accordance with examples as disclosed herein. In some examples, aspects of the operations of 520 may be performed by a transmitter 440 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for storing, at a memory system, first information associated with performing one or more access commands; determining whether a random access parameter associated with the memory system performing the one or more access commands satisfies a threshold based at least in part on the first information; determining a first delay duration between completing a first access command by the memory system and receiving a second access command by the memory system; and transmitting, to a host system, an indication to increase a frequency of a clock at the host system based at least in part on determining whether the random access parameter satisfies the threshold and determining the first delay duration.

Aspect 2: The method, apparatus, or non-transitory computer-readable medium of aspect 1 where determining whether the random access parameter satisfies the threshold, further includes operations, features, circuitry, logic, means, or instructions, or any combination thereof for determining that a data fragmentation parameter of the memory system satisfies a data fragmentation threshold based at least in part on the first information, where the random access parameter includes the data fragmentation parameter, where the threshold includes the data fragmentation threshold, where transmitting the indication is based at least in part on determining that the data fragmentation parameter satisfies the data fragmentation threshold.

Aspect 3: The method, apparatus, or non-transitory computer-readable medium of any of aspects 1 through 2 where determining whether the random access parameter satisfies the threshold, further includes operations, features, circuitry, logic, means, or instructions, or any combination thereof for determining that a size of information associated with the one or more access commands performed by the memory system satisfies a second threshold, where the random access parameter includes the size of information, where the threshold includes the second threshold, where transmitting the indication is based at least in part on determining that the size of information satisfies the second threshold.

Aspect 4: The method, apparatus, or non-transitory computer-readable medium of any of aspects 1 through 3 where determining whether the random access parameter satisfies the threshold, further includes operations, features, circuitry, logic, means, or instructions, or any combination thereof for determining that a depth of a command queue storing the one or more access commands to be performed by the memory system satisfies a second threshold, where the random access parameter includes the depth of the command queue, where the threshold includes the second threshold, where transmitting the indication is based at least in part on determining that the depth of the command queue satisfies the second threshold.

Aspect 5: The method, apparatus, or non-transitory computer-readable medium of any of aspects 1 through 4 where determining whether the random access parameter satisfies the threshold, further includes operations, features, circuitry, logic, means, or instructions, or any combination thereof for determining that a quantity of hibernate commands issued over a duration associated with the first information satisfy a second threshold, where the random access parameter includes the quantity of hibernate commands, where the threshold includes the second threshold, where transmitting the indication is based at least in part on determining that the quantity of hibernate commands satisfies the second threshold.

Aspect 6: The method, apparatus, or non-transitory computer-readable medium of any of aspects 1 through 5, further including operations, features, circuitry, logic, means, or instructions, or any combination thereof for determining that the random access parameter associated with the memory system fails to satisfy the threshold after a duration of time based at least in part on the first information and deleting the first information stored at the memory system based at least in part on the determining that the random access parameter fails to satisfy the threshold after the duration of time.

Aspect 7: The method, apparatus, or non-transitory computer-readable medium of any of aspects 1 through 6 where the first information includes one or more of a command size, a queue depth, a command type, or a command delay duration associated with the one or more access commands.

Aspect 8: The method, apparatus, or non-transitory computer-readable medium of any of aspects 1 through 7, further including operations, features, circuitry, logic, means, or instructions, or any combination thereof for determining that the first delay duration satisfies a second threshold, where transmitting the indication to increase the frequency of the clock at the host system is based at least in part on determining that the first delay duration satisfies the threshold.

Aspect 9: The method, apparatus, or non-transitory computer-readable medium of any of aspects 1 through 8, further including operations, features, circuitry, logic, means, or instructions, or any combination thereof for receiving, at the memory system, a command to increase the frequency of the clock at the host system and updating the first information at the memory system based at least in part on receiving the command.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
one or more memory devices; and
processing circuitry coupled with the one or more memory devices and configured to cause the memory system to:
determine a first delay duration between completing a first access command by the memory system and receiving a second access command by the memory system;
transmit an indication to increase a frequency of a clock based at least in part on the first delay duration satisfying a threshold; and
perform one or more operations in response to one or more commands in accordance with the increased frequency of the clock.

2. The memory system of claim 1, wherein the processing circuitry is further configured to cause the memory system to:

store information associated with the indication to increase the frequency of the clock, wherein transmitting the indication is in accordance with the information.

3. The memory system of claim 2, wherein the processing circuitry is further configured to cause the memory system to:
delete the stored information after transmitting the indication to increase the frequency of the clock.

4. The memory system of claim 3, wherein the stored information comprises one or more parameters, and wherein the processing circuitry is further configured to cause the memory system to:
delete the stored information in response to determining that the one or more parameters do not satisfy a threshold value after a duration.

5. The memory system of claim 3, wherein the processing circuitry is further configured to cause the memory system to:
receive one or more hibernate commands; and
delete the stored information in response to determining that a quantity of the one or more hibernate commands satisfies a threshold quantity.

6. The memory system of claim 2, wherein the information comprises one or more parameters associated with a level of fragmentation at a host system.

7. The memory system of claim 2, wherein the information comprises one or more of a command size, a queue depth, a command type, or a command delay duration associated with one or more access commands.

8. A memory system, comprising:
one or more memory devices; and
processing circuitry coupled with the one or more memory devices and configured to cause the memory system to:
store, at the memory system, first information associated with performing one or more access commands;
determine whether a random access parameter associated with the memory system performing the one or more access commands satisfies a threshold based at least in part on the first information;
transmit an indication to increase a frequency of a clock based at least in part on determining whether the random access parameter satisfies the threshold;
determine that the random access parameter associated with the memory system fails to satisfy the threshold after a duration based at least in part on the first information; and
delete the first information based at least in part on the determining that the random access parameter fails to satisfy the threshold.

9. The memory system of claim 8, wherein the processing circuitry is further configured to cause the memory system to:
determine a first delay duration between completing a first access command by the memory system and receiving a second access command by the memory system, wherein transmitting the indication to increase the frequency of the clock is in response to the first delay duration satisfying a threshold duration.

10. The memory system of claim 8, wherein the processing circuitry is further configured to cause the memory system to:
receive one or more hibernate commands; and
delete the first information in response to determining that a quantity of the one or more hibernate commands satisfies a threshold quantity.

11. The memory system of claim 8, wherein the first information comprises one or more parameters associated with a level of fragmentation at a host system.

12. The memory system of claim 8, wherein the first information comprises one or more of a command size, a queue depth, a command type, or a command delay duration associated with the one or more access commands.

13. The memory system of claim 8, wherein the random access parameter comprises a data fragmentation parameter, a size of information associated with the one or more access commands, a depth of a command queue storing the one or more access commands, or a combination thereof.

14. A non-transitory computer-readable medium storing code, the code comprising instructions executable by one or more processors to:

determine a first delay duration between completing a first access command by a memory system and receiving a second access command by the memory system;

transmit an indication to increase a frequency of a clock based at least in part on the first delay duration satisfying a threshold; and perform one or more operations in response to one or more commands in accordance with the increased frequency of the clock.

15. The non-transitory computer-readable medium of claim 14, wherein the instructions are further executable by the one or more processors to:

store information associated with the indication to increase the frequency of the clock, wherein transmitting the indication is in accordance with the stored information.

16. The non-transitory computer-readable medium of claim 15, wherein the instructions are further executable by the one or more processors to:

delete the stored information after transmitting the indication to increase the frequency of the clock.

17. The non-transitory computer-readable medium of claim 16, wherein the stored information comprises one or more parameters, and wherein the instructions are further executable by the one or more processors to:

delete the stored information in response to determining that the one or more parameters do not satisfy a threshold value after a duration.

18. The non-transitory computer-readable medium of claim 16, wherein the instructions are further executable by the one or more processors to:

receive one or more hibernate commands; and delete the stored information in response to determining that a quantity of the one or more hibernate commands satisfies a threshold quantity.

19. The non-transitory computer-readable medium of claim 15, wherein the information comprises one or more parameters associated with a level of fragmentation at a host system.

20. The non-transitory computer-readable medium of claim 15, wherein the information comprises one or more of a command size, a queue depth, a command type, or a command delay duration associated with one or more access commands.

* * * * *